United States Patent
Kim et al.

(10) Patent No.: US 9,826,441 B2
(45) Date of Patent: Nov. 21, 2017

(54) APPARATUS AND METHOD FOR PERFORMING HANDOVER OF TERMINAL IN WIRELESS COMMUNICATION SYSTEM

(75) Inventors: Dai-Kwan Kim, Seoul (KR); Jung-Je Son, Seongnam-si (KR); Jong-Hyung Kwun, Seongnam-si (KR); Young-Hyun Jeon, Guri-si (KR); Jae-Hyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2730 days.

(21) Appl. No.: 12/363,208

(22) Filed: Jan. 30, 2009

(65) Prior Publication Data
US 2009/0196257 A1  Aug. 6, 2009

(30) Foreign Application Priority Data
Jan. 31, 2008  (KR) .................. 10-2008-0009903

(51) Int. Cl.
*H04W 4/00* (2009.01)
*H04W 36/00* (2009.01)
*H04W 72/04* (2009.01)

(52) U.S. Cl.
CPC ...... *H04W 36/0055* (2013.01); *H04W 72/042* (2013.01)

(58) Field of Classification Search
USPC ....... 370/331–334; 455/432.1–433, 436–444
See application file for complete search history.

(56) References Cited

U.S. PATENT DOCUMENTS

| | | | |
|---|---|---|---|
| 2005/0192011 A1* | 9/2005 | Hong et al. .................. 455/440 |
| 2005/0250498 A1* | 11/2005 | Lim et al. .................... 455/436 |
| 2006/0079235 A1* | 4/2006 | Kim ............................. 455/439 |
| 2007/0072615 A1* | 3/2007 | Kim et al. .................... 455/436 |
| 2007/0202882 A1* | 8/2007 | Ju et al. ........................ 455/450 |

FOREIGN PATENT DOCUMENTS

| KR | 10-2005-0081324 A | 8/2005 |
|---|---|---|
| KR | 10-2007-0092571 A | 9/2007 |
| KR | 10-2007-0094310 A | 9/2007 |

OTHER PUBLICATIONS

Lee, et al., "Fast Handover Algorithm for IEEE 802.16e Broadband Wireless Access System", Wireless Pervasive Computing, Jan. 18, 2006.

\* cited by examiner

*Primary Examiner* — Thai Hoang
(74) *Attorney, Agent, or Firm* — Jefferson IP Law, LLP

(57) ABSTRACT

Provided are an apparatus and a method for performing a handover of a terminal in a wireless communication system. In the method, a ranging code is transmitted to a target base station on which a handover is to be performed. A ranging response message comprising Connection Identification (CID) update information is received from the target base station together with resource assignment information for transmission of a ranging request message. Therefore, fast resumption of downlink data reception of the terminal can be supported through fast CID update during a handover.

4 Claims, 5 Drawing Sheets

APPARATUS AND METHOD FOR PERFORMING HANDOVER OF TERMINAL IN WIRELESS COMMUNICATION SYSTEM

PRIORITY

This application claims priority under 35 U.S.C. §119 to an application filed in the Korean Intellectual Property Office on Jan. 31, 2008 and assigned Serial No. 10-2008-0009903, the contents of which are incorporated herein by reference.

BACKGROUND OF THE INVENTION

1. Field of the Invention

The present invention relates generally to an apparatus and a method for performing a handover of a terminal in a wireless communication system, and in particular, to an apparatus and a method for supporting fast resumption of downlink data reception of a terminal through fast update of a Connection Identification (CID) during a handover in an Institute of Electrical and Electronics Engineers (IEEE) 802.16e system.

2. Description of the Related Art

IEEE 802.16e supports an inter-cell handover in order to guarantee mobility of a terminal. FIGS. 1 and 2 are views illustrating a conventional handover procedure supported by IEEE 802.16e.

First, the conventional handover procedure is described below with reference to FIG. 1. When it is determined that a handover is required, a terminal 100 transmits a Mobile_Mobile Station Handover-Request (MOB_MSHO-REQ) message for a handover request to a serving base station 120 which the terminal 100 is currently accessing (step 101). At this point, the serving base station 120 receives the message and transmits a HandOver (HO) Request message for a handover request to target base stations 130 and 140 which the terminal 100 desires to access (steps 102 and 103). Each of the target base stations 130 and 140 determines whether to allow the handover of the terminal 100, and transmits a HO Response message for informing a determination result to the serving base station 120 (steps 104 and 105). At this point, the serving base station 120 consolidates HO Response messages from the target base stations 130 and 140, and transmits a Mobile_Base Station Handover-Response (MOB_BSHO-RSP) message to the terminal 100 (step 106). The terminal 100 obtains information regarding the target base stations that have allowed the handover through the message, determines a target base station on which the handover is to be performed, informs the serving base station 120 of a determination result through a Mobile_Handover-Indication (MOB_HO-IND) message, and performs the handover (step 107). At this point, the serving base station 120 transmits a HO confirm message to the target base station 130 on which the handover is to be performed, to inform the target base station 130 that the terminal 100 is scheduled to actually perform the handover and access the target base station 130 (step 108).

After that, the terminal 100 which is to perform the handover performs a handover ranging on the target base station. Examples of a conventional method for performing the handover ranging include a method using a ranging code and a method using a Fast_Ranging_IE. FIG. 1 corresponds to the method using the ranging code. According to the method using the ranging code, the terminal 100 transmits a ranging code arbitrarily selected from a handover ranging code region to the target base station 130 to perform the handover ranging (step 109). Here, the ranging code is a competitiveness-based arbitrary code for synchronization in a physical layer and informing an entry of the terminal 100. At this point, the target base station 130 transmits a physical channel correction value by transmitting a Ranging-Response (RNG-RSP) message for the ranging code to the terminal 100, and informs resource assignment for transmission of Ranging-Request (RNG-REQ) message by the terminal 100 through UpLink-MAP (UL-MAP) (step 110). After that, the terminal 100 transmits an RNG-REQ message to the target base station 130 using an assigned resource (step 111), and the target base station 130 transmits an RNG-RSP message including CID update information to the terminal 100 in response thereto (step 112). Through this procedure, data transmission/reception between the terminal 100 and the target base station 130 can be performed (step 113).

FIG. 2 corresponds to the method for performing a handover ranging using the Fast_Ranging_IE. Here, steps before the handover ranging is performed are the same as those of FIG. 1. That is, steps 201 to 208 are the same as steps 101 to 108 of FIG. 1. Therefore, only steps of performing the handover ranging will be described below. A terminal 200 is assigned a resource for transmission of RNG-REQ message through Fast_Ranging_IE included in UL_MAP at an appointed time after an expected action time (step 209), and transmits RNG-REQ message to a target base station 230 using the assigned resource (step 210). At this point, the target base station 230 transmits an RNG-RSP message including CID update information to the terminal 200 in response thereto (step 211), whereby data transmission/reception between the terminal 200 and the target base station 230 becomes possible (step 212). The method using the Fast_Ranging_IE of FIG. 2 has an advantage that a time taken until data transmission/reception is relatively short compared to the method using the ranging code of FIG. 1 because step of transmitting the ranging code and step of receiving RNG-RSP message, which is a response thereto, are omitted.

In other words, the handover ranging method using the ranging code requires four times of message exchange procedures until transmission/reception of data. That is, it is not until RNG-REQ and RNG-RSP procedures are performed after a resource for RNG-REQ is assigned through handover ranging that user data can be transmitted and received. Therefore, a service delay time for the user is lengthened. On the other hand, the handover ranging method using Fast_Ranging_IE can transmit an RNG-REQ message without competition using an assigned resource, and thus has a simple procedure compared to the handover ranging method using the ranging code, so that a delay time until data transmission/reception is short. However, the handover ranging method using Fast_Ranging_IE has a disadvantage of high probability of failure. Therefore, the handover ranging method using Fast_Ranging_IE has a possibility that a delay time may be lengthened because a connection should be made again through handover ranging in the case where a handover fails.

SUMMARY OF THE INVENTION

An object of the present invention is to provide an apparatus and a method for performing a handover of a terminal in a wireless communication system.

Another object of the present invention is to provide an apparatus and a method for supporting fast resumption of downlink data reception of a terminal through fast update of a Connection Identification (CID) during a handover in an IEEE 802.16e system.

Still another object of the present invention is to provide an apparatus and a method for performing handover ranging using a non-competitiveness based dedicated HO_Ranging_code in an IEEE 802.16e system.

Yet another object of the present invention is to provide an apparatus and a method for transmitting a ranging response message including CID update information together with Fast_Ranging_IE in an IEEE 802.16e system.

According to an aspect of the present invention, a method for performing a handover of a terminal in a wireless communication system includes: transmitting a ranging code to a target base station on which the handover is to be performed; and receiving a ranging response message including Connection Identification (CID) update information and resource assignment information for transmission of a ranging request message from the target base station.

According to another aspect of the present invention, a method for allowing a target base station to support performance of a handover by a terminal in a wireless communication system includes: receiving a ranging code from a terminal; and transmitting, to the terminal, a ranging response message including Connection Identification (CID) update information together with resource assignment information for transmission of a ranging request message of the terminal.

According to still another aspect of the present invention, an apparatus for performing a handover of a terminal in a wireless communication system includes: a terminal for transmitting a ranging code to a target base station on which a handover is to be performed, and receiving a ranging response message from the target base station; and the target base station for receiving the ranging code from the terminal, and transmitting, to the terminal, the ranging response message including Connection Identification (CID) update information together with resource assignment information for transmission of a ranging request message of the terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Exemplary embodiments of the present invention provide an apparatus and a method for supporting fast resumption of downlink data reception of a terminal through fast update of a CID during a handover in an IEEE 802.16e system.

The present invention proposes a method for updating a CID using an RNG-RSP message transmitted together with a non-competitiveness based dedicated HO_ranging_code and Fast_Ranging_IE in a handover procedure of an IEEE 802.16e system, and a corresponding method for receiving downlink data fast. That is, the present invention includes a method for assigning, at a target base station, a dedicated HO_ranging_code to a user who has requested a handover, and releasing a corresponding dedicated right, and a method for transmitting a ranging response message together with Fast_Ranging_IE in order to update a CID.

Figure 1:
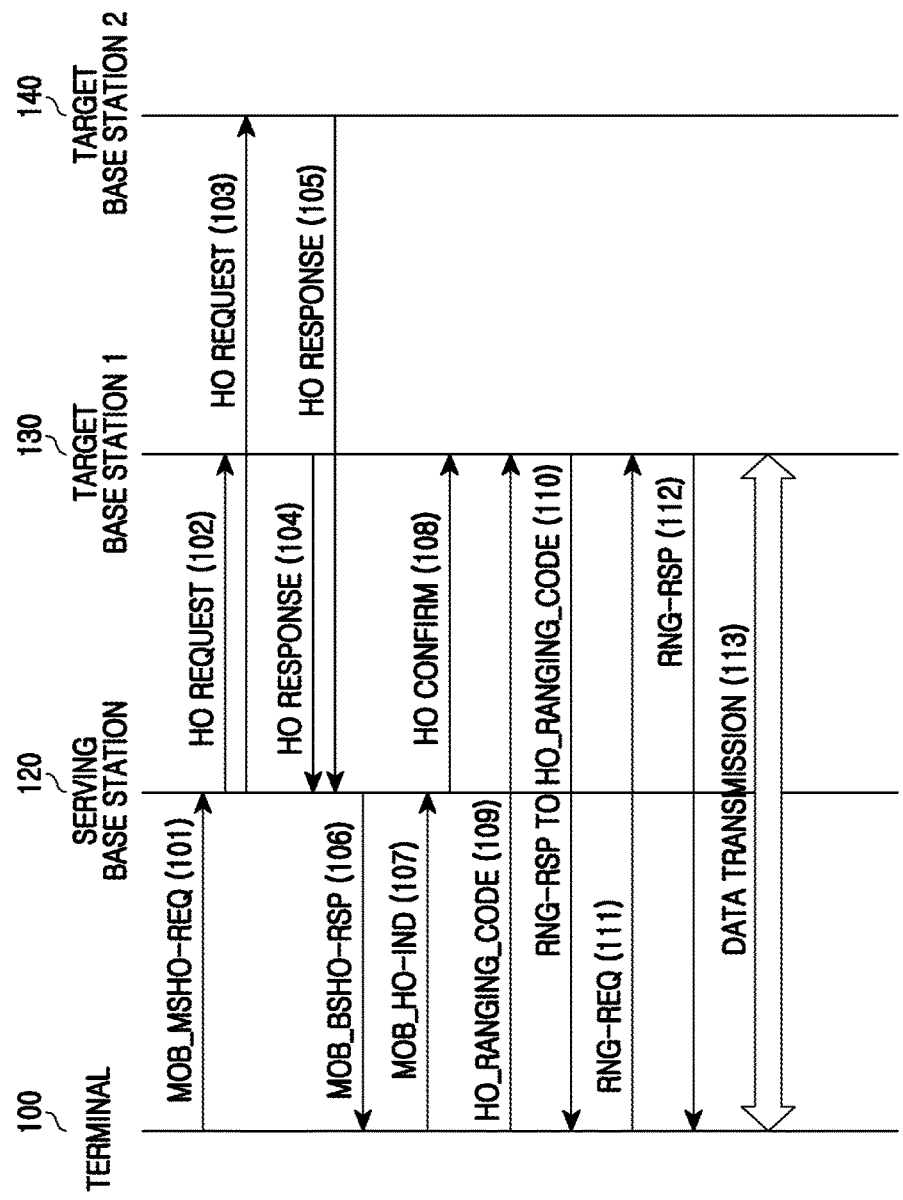
FIG. 1 is a view illustrating a conventional handover procedure supported by IEEE 802.16e.
Figure 2:
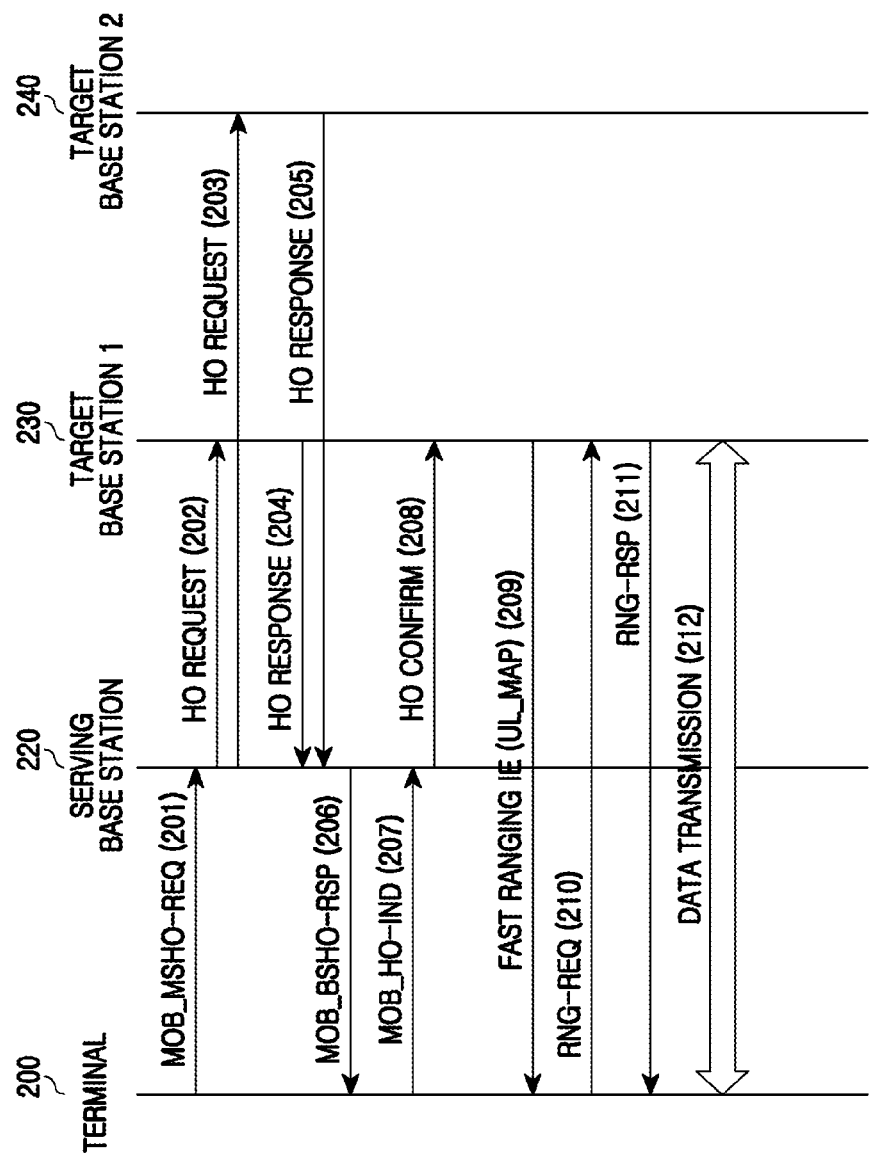
FIG. 2 is a view illustrating another conventional handover procedure supported by IEEE 802.16e.
Figure 3:
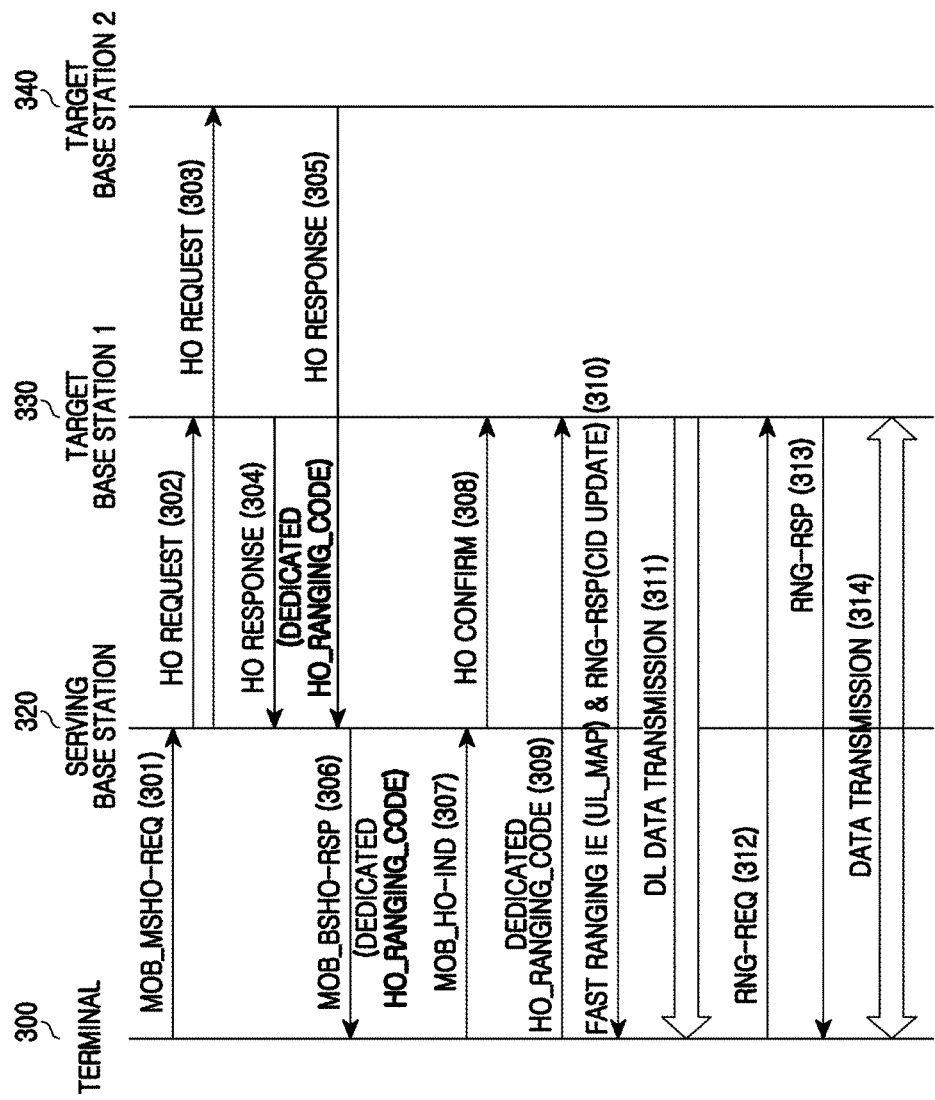
FIG. 3 is a view illustrating a handover performance procedure of a terminal in a wireless communication system according to an exemplary embodiment of the present invention.

FIG. 3 is a view illustrating a handover procedure of a mobile terminal in a wireless communication system according to an exemplary embodiment of the present invention.

Referring to FIG. 3, when a terminal 300 determines that a handover is required, the terminal 300 transmits a MOB_MSHO-REQ message for a handover request to a serving base station 320 which the terminal 300 is currently accessing (step 301). At this point, the serving base station 320 receives the message and transmits a HO Request message for a handover request to candidate base stations 330 and 340 which the terminal 300 can access (steps 302 and 303).

In steps 304 and 305, each of the candidate base stations 330 and 340 determines whether to allow the handover of the terminal 300, and transmits a HO Response message for informing a determination result to the serving base station 320. At this point, the candidate base station 330 that allows the handover of the terminal 300 designates, within the HO Response message, a HO_ranging_code (referred to as a 'dedicated HO_ranging_code' hereinafter) to be dedicated to the terminal 300 when the terminal 300 accesses the candidate base station 330, and transmits the same, and matches a Media Access Control (MAC) address of the terminal 300 with the dedicated HO_ranging_code and stores the same. Here, the dedicated HO_ranging_code is a non competitiveness-based arbitrary code for informing an entry of the terminal 300. After that, in step 306, the serving base station 320 consolidates HO Response messages from the candidate base stations 330 and 340, and transmits a MOB_BSHO-RSP message including the dedicated HO_ranging_code to the terminal 300. Therefore, the terminal 300 obtains information regarding the candidate base stations that have allowed the handover through the MOB_BSHO-RSP message.

After that, in step 307, the terminal 300 determines the target base station 330 on which the handover is to be performed using the above-obtained information, informs the serving base station 320 of a determination result through an MOB_HO-IND message, and then performs the handover to the above-determined target base station 330. At this point, in step 308, the serving base station 320 transmits a HO confirm message to the target base station 330 determined by the terminal 300, to inform the target base station 330 that the terminal 300 is scheduled to actually perform the handover and access the target base station 330. Here, of a plurality of candidate base stations that have allowed the handover, the target base station 330 that has received the HO confirm message receives a dedicated HO_ranging_code of the terminal 300, and stands by. The other candidate base station 340 that has not received the HO confirm message deletes a dedicated right regarding the dedicated HO_ranging_code of the terminal 300 after a predetermined time using a timer.

After that, the terminal 300 ends an access to the serving base station 320, and in step 309, initiates handover ranging procedure by transmitting the dedicated HO_ranging_code already received from the target base station 330 to the target base station 330 on which the terminal 300 has determined to perform the handover. At this point, since the target base station 330 can recognize the terminal 300 that has been assigned the dedicated right for a corresponding dedicated HO_ranging_code, the target base station 330 can identify the terminal 300 using only the handover ranging. Therefore, in step 310, the target base station 330 that has recognized that the terminal 300 has accessed the target base station 330 informs resource assignment for RNG-REQ message transmission of the terminal 300 through Fast_Ranging_IE included in UL-MAP, and simultaneously, transmits an RNG-RSP message including CID update information to the same MAC address to allow the terminal 300 to update a CID. Therefore, the terminal 300 obtains a new CID from the target base station 330, and in step 311, receives downlink data.

As described above, after downlink data reception is resumed first, that is, after the downlink data reception that has been suspended due to the handover is resumed, the terminal 300 transmits an RNG-REQ message to the target base station 330 using the assigned resource in step 312. At this point, the transmitted RNG-REQ message includes message authentication information (for example, Cipher-based Message Authentication Code (CMAC) information). At this point, the target base station 330 confirms whether the authentication information transmitted by the terminal 300 is valid, and in step 313, responds by transmitting an RNG-RSP message. Through this procedure, in step 314, up/downlink data transmission/reception between the terminal 300 and the target base station 330 become possible.

Figure 4:
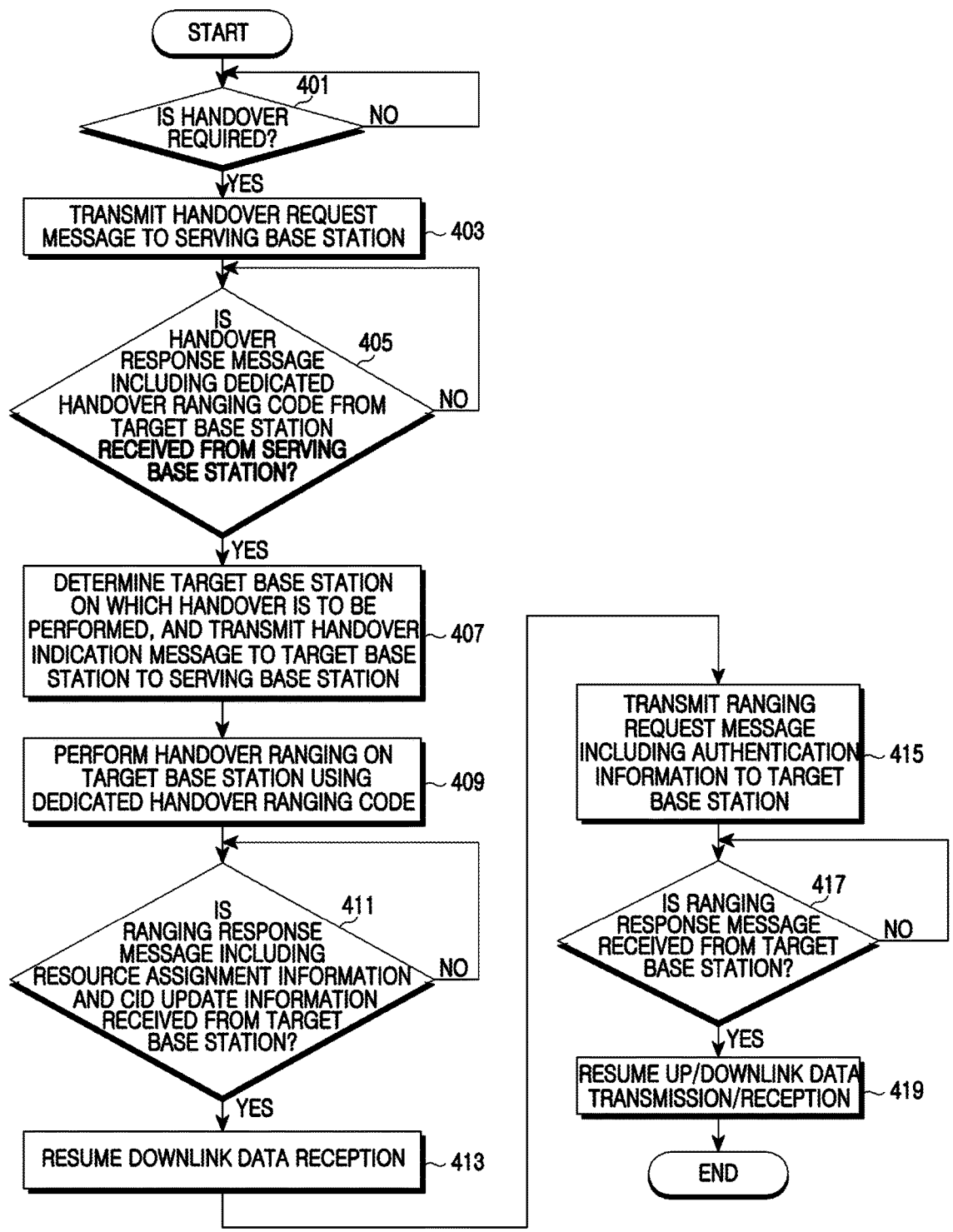
FIG. 4 is a flowchart illustrating a handover procedure of a terminal according to an exemplary embodiment of the present invention.

FIG. 4 is a flowchart illustrating a handover procedure of a terminal according to an exemplary embodiment of the present invention.

Referring to FIG. 4, in step 401, the terminal monitors whether a handover is required or not. When is the terminal determines that the handover is required, the terminal transmits an MOB_MSHO-REQ message to a serving base station which the terminal is currently accessing in step 403. After that, in step 405, the terminal examines whether an MOB_BSHO-RSP message is received from the serving base station. Here, the MOB_BSHO-RSP message includes a dedicated HO_ranging code which a candidate base station allowing the handover of the terminal has assigned to the terminal.

When the MOB_BSHO-RSP message is received, the terminal determines a target base station on which the handover is to be performed using the MOB_BSHO-RSP message, and transmits an MOB_HO-IND message including a determination result to the serving base station (step 407). By doing so, the terminal ends an access to the serving base station. That is, up/downlink data transmission/reception through the serving base station is ended.

After that, in step 409, the terminal performs handover ranging by transmitting the dedicated HO_ranging_code already received from the corresponding target base station to the target base station on which the terminal has determined to perform the handover. After that, in step 411, the terminal examines whether resource assignment information for transmission of an RNG-REQ message by the terminal is received from the target base station using Fast_Ranging_IE included in UL-MAP, and simultaneously, examines whether an RNG-RSP message including CID update information is received. When the resource assignment information and the RNG-RSP message including the CID update information are received, the terminal resumes downlink data reception through the target base station (step 413).

As described above, after downlink data reception is resumed first, the terminal transmits an RNG-REQ message to the target base station using the assigned resource in step 415. At this point, the transmitted RNG-REQ message includes message authentication information (for example, Cipher-based Message Authentication Code (CMAC) information). After that, in step 417, the terminal examines whether an RNG-RSP message is received from the target base station. When the RNG-RSP message is received, the terminal resumes up/downlink data transmission/reception through the target base station in step 419.

After that, the terminal ends an algorithm according to the exemplary embodiment of the present invention.

Figure 5:
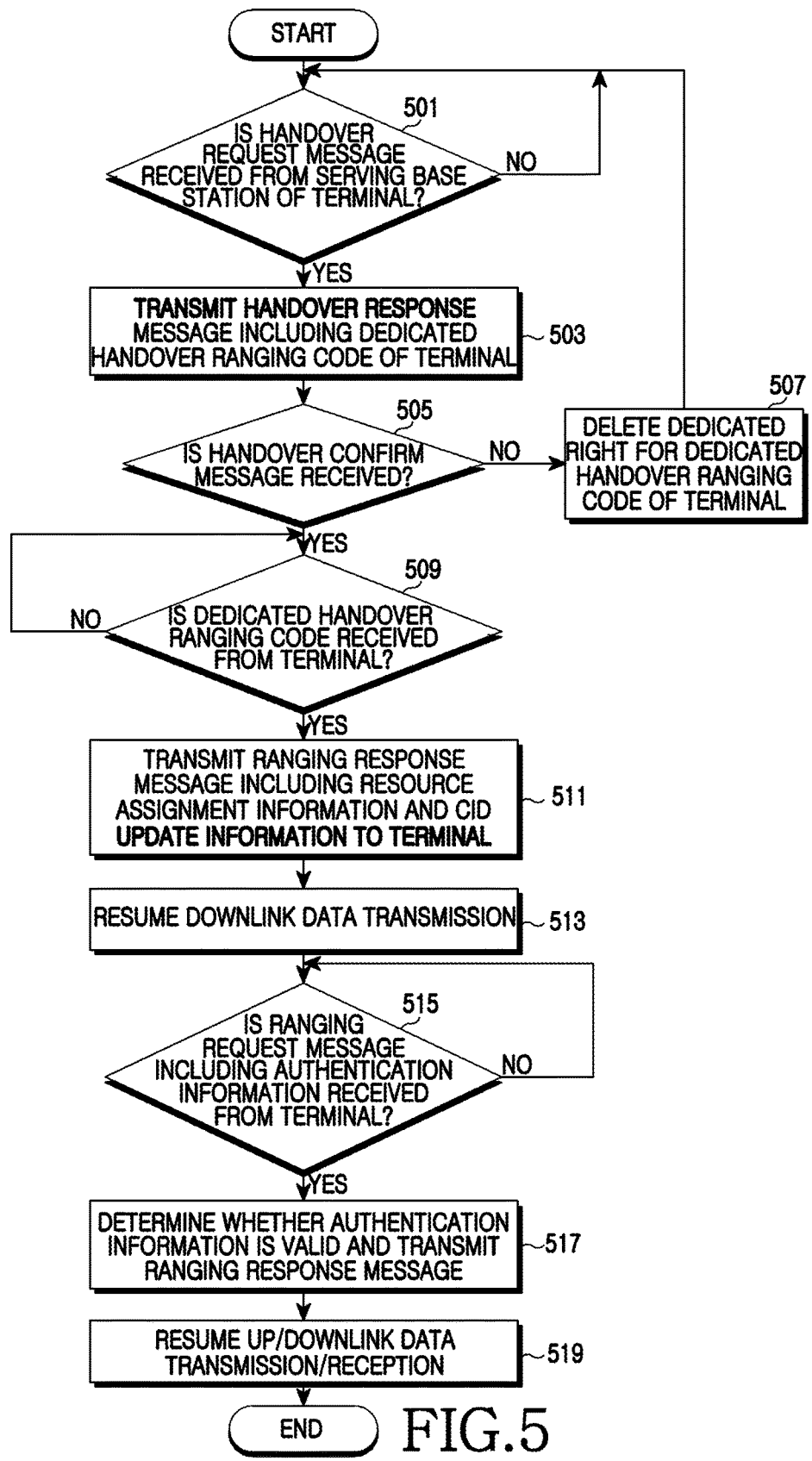
FIG. 5 is a flowchart illustrating a procedure for a handover of a terminal at a target base station according to an exemplary embodiment of the present invention.

FIG. 5 is a flowchart illustrating a procedure for a handover of a terminal at a target base station according to an exemplary embodiment of the present invention.

Referring to FIG. 5, in step 501, the candidate base station of the terminal examines whether an HO Request message of the terminal is received from a serving base station of the terminal.

When the HO Request message is received, the candidate base station determines whether to allow the handover of the terminal, and transmits an HO Response message including a determination result to the serving base station (step 503). Here, when the candidate base station determines the handover of the terminal, the candidate base station designates a dedicated HO_ranging_code to be dedicated to the terminal when the terminal accesses the target base station, incorporates the dedicated HO_ranging_code into the HO Response message together with the determination result, transmits the HO Response message, and matches an MAC address of the terminal with the dedicated HO_ranging_code and stores the same.

After that, in step 505, the candidate base station examines whether a HO confirm message informing that the terminal is scheduled to actually perform the handover and access the candidate base station is received from the serving base station. When the HO confirm message is not received for a predetermined time, the candidate base station deletes a dedicated right for the dedicated HO_ranging_code assigned to the terminal, goes back to step 501, and repeatedly perform the subsequent steps (step 507).

On the other hand, when the HO confirm message is received, the candidate base station knows it is selected as target base station among the candidate base stations by the terminal, and the target base station monitors whether the already assigned dedicated HO_ranging_code is received from the terminal (step 509). When the already assigned dedicated HO_ranging_code is received from the terminal, the target base station recognizes that the terminal has accessed the target base station through the dedicated HO_ranging_code, and in step 511, transmits resource assignment information for transmission of an RNG-REQ message by the terminal through Fast_Ranging_IE included in UL-MAP to the terminal, and simultaneously, transmits an RNG-RSP message including CID update information to the same MAC address. Since the target base station can recognize the terminal that has been assigned the dedicated right for a corresponding dedicated HO_ranging_code, the target base station can identify the terminal using only the handover ranging. After that, in step 513, the target base station resumes downlink data transmission for the terminal.

After that, in step 515, the target base station examines whether an RNG-REQ message including message authentication information (for example, CMAC information) is received from the terminal through the resource assigned to the terminal. When the RNG-REQ message is received, the target base station determines whether the message authentication information transmitted from the terminal is valid, and then responds by transmitting an RNG-RSP message to the terminal (step 517). After that, in step 519, the target base station resumes up/downlink data transmission/reception for the terminal.

After that, the target base station ends an algorithm according to the exemplary embodiment of the present invention.

As described above, the present invention has an advantage of supporting fast resumption of downlink data reception through fast CID update during a handover by providing a handover ranging method using a non-competitiveness based dedicated HO_Ranging_code, and a method of transmitting an RNG-RSP message including CID update information together with Fast_Ranging_IE. That is, a handover delay can be reduced by simplifying a connection procedure up to downlink data reception. Also, since Fast_Ranging_IE is received after handover ranging of a terminal and an RNG-REQ message is transmitted, failure probability thereof can be reduced.

Although the invention has been shown and described with reference to certain preferred embodiments thereof, it will be understood by those skilled in the art that various changes in form and details may be made therein without departing from the spirit and scope of the invention as defined by the appended claims. Therefore, the scope of the present invention should not be limited to the above-described embodiments but should be determined by not only the appended claims but also the equivalents thereof.

What is claimed is:

1. A method for performing a handover of a terminal in a wireless communication system, the method comprising:
   when the terminal determines that a handover is required, transmitting a handover request message to a serving base station;
   receiving a handover response message from the serving base station, the handover response message comprising information regarding whether to allow a handover of the terminal for each candidate base station, and a dedicated handover ranging code;
   determining one candidate base station as target base station using the information regarding whether to allow the handover of the terminal for each candidate base station, and transmitting a handover indication message comprising a determination result to the serving base station;
   transmitting, to the determined one target base station, a dedicated handover ranging code corresponding to the determined one target base station; and
   receiving resource assignment information for transmission of a ranging request message from the determined one target base station.

2. The method of claim 1, further comprising:
   transmitting the ranging request message to the target base station using a resource assigned through the resource assignment information;
   receiving a ranging response message from the target base station;
   resuming up/downlink data transmission/reception using the target base station.

3. An apparatus for performing a handover of a terminal in a wireless communication system, the apparatus comprising:
   a terminal for, when it is determined that the handover is required, transmitting a handover request message to a serving base station, and when a handover response message comprising information regarding whether to allow the handover of the terminal for each candidate base station, and a dedicated handover ranging code is received from the serving base station, determining one target base station using the information regarding whether to allow the handover of the terminal for each candidate base station, transmitting a handover indication message comprising a determination result to the serving base station, transmitting, to the determined one target base station, a dedicated handover ranging code corresponding to the determined one target base station, and receiving resource assignment information for transmission of a ranging request message from the determined one target base station; and
   the target base station for, when the handover request message is received from the serving base station of the terminal, transmitting, to the serving base station, the handover response message comprising the information regarding whether to allow the handover of the terminal, and the dedicated handover ranging code assigned to the terminal, and when a handover confirm message informing the handover of the terminal is received from the serving base station, standing by reception of a dedicated handover ranging code from the terminal, and when the dedicated handover ranging code is received from the terminal, transmitting, to the terminal, the resource assignment information for transmission of the ranging request message of the terminal.

4. The apparatus of claim 3, wherein the terminal transmits the ranging request message to the target base station using a resource assigned through the resource assignment information, receives a ranging response message from the target base station, and resumes up/downlink data transmission/reception using the target base station; and
   the target base station receives the ranging request message comprising message authentication information from the terminal using the resource assigned through the resource assignment information, determines whether the authentication information is valid to transmit the ranging response message to the terminal, and performs up/downlink data transmission/reception for the terminal.

* * * * *